(12) United States Patent
Scotti et al.

(10) Patent No.: US 9,661,919 B2
(45) Date of Patent: *May 30, 2017

(54) SYSTEM AND METHOD FOR A GARDEN TABLE ASSEMBLY

(71) Applicant: C + D, LLC, Glendale, AZ (US)

(72) Inventors: Dawn R. Scotti, Glendale, AZ (US); Chase Albright, Glendale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/949,238

(22) Filed: Nov. 23, 2015

(65) Prior Publication Data

US 2016/0073773 A1    Mar. 17, 2016

Related U.S. Application Data

(63) Continuation of application No. 14/470,010, filed on Aug. 27, 2014, now Pat. No. 9,215,925.

(60) Provisional application No. 61/871,632, filed on Aug. 29, 2013.

(51) Int. Cl.
| | |
|---|---|
| *A47B 37/00* | (2006.01) |
| *A47B 37/04* | (2006.01) |
| *A01G 31/02* | (2006.01) |
| *A47B 13/08* | (2006.01) |

(52) U.S. Cl.
CPC .............. *A47B 37/04* (2013.01); *A01G 31/02* (2013.01); *A47B 13/086* (2013.01); *A47B 13/088* (2013.01)

(58) Field of Classification Search
CPC ..... A47B 13/16; A47B 13/086; A47B 13/088; A47B 37/04; A47B 83/02; A47B 39/06; A47B 3/14; A47F 7/0078; A47F 7/28; A47F 7/283; B01L 9/02; A01G 31/02

USPC .............. 108/24, 25, 26, 161, 50.13, 50.11; 297/158.3

See application file for complete search history.

(56) References Cited

U.S. PATENT DOCUMENTS

| | | | | |
|---|---|---|---|---|
| 1,952,568 | A * | 3/1934 | Schapp | A47L 15/0086 108/24 |
| 2,022,591 | A * | 11/1935 | Everitt | A47B 31/00 108/24 |
| 2,024,259 | A * | 12/1935 | Troeber | A47J 36/24 126/33 |
| 3,514,154 | A * | 5/1970 | Kotler | A47B 1/04 108/77 |
| 4,041,964 | A * | 8/1977 | Shamoon | A47J 47/20 108/26 |
| 4,739,580 | A * | 4/1988 | Simmons | A47B 3/0818 108/50.13 |
| 5,060,580 | A * | 10/1991 | Shaw | A47B 3/06 108/25 |

(Continued)

OTHER PUBLICATIONS

Non-Final Office Action Dated Jul. 23, 2015 for U.S. Appl. No. 14/470,010.

(Continued)

*Primary Examiner* — Jose V Chen

(57) ABSTRACT

According to various embodiments, a furniture system and method of manufacture is disclosed. The furniture system may comprise one or more raised horizontal platforms. The plurality of platforms may flank a basin, such as a catch basin. The furniture system may comprise one or more support members to support and/or raise the platforms and/or basin from ground level. The furniture system may comprise one or more containers.

16 Claims, 8 Drawing Sheets

(56) References Cited

U.S. PATENT DOCUMENTS

| | | | | |
|---|---|---|---|---|
| 5,327,838 A * | 7/1994 | Beltman | ............... | A47B 25/00 108/25 |
| 6,591,831 B2 * | 7/2003 | Reynolds | ............... | A47J 36/24 108/118 |
| 8,015,928 B2 * | 9/2011 | Chen | ............... | A47B 3/0915 108/11 |
| 8,857,346 B2 * | 10/2014 | Khanjian | ............... | A47B 3/087 108/26 |
| 9,215,925 B2 * | 12/2015 | Scotti | ............... | A47B 37/04 |
| 2002/0020304 A1 * | 2/2002 | Reynolds | ............... | A47J 36/24 99/339 |
| 2002/0040667 A1 * | 4/2002 | Birsel | ............... | A47B 21/00 108/25 |
| 2005/0160948 A1 * | 7/2005 | Irwin | ............... | A61G 13/0027 108/24 |
| 2007/0034200 A1 * | 2/2007 | Torre | ............... | A47J 27/18 126/33 |
| 2011/0088974 A1 * | 4/2011 | Bond | ............... | A47B 13/00 182/129 |
| 2014/0069304 A1 * | 3/2014 | Elstad | ............... | A47B 13/16 108/26 |

OTHER PUBLICATIONS

Notice of Allowance dated Nov. 12, 2015 for U.S. Appl. No. 14/470,010.

\* cited by examiner

SYSTEM AND METHOD FOR A GARDEN TABLE ASSEMBLY

CROSS-REFERENCE TO RELATED APPLICATIONS

This application claims priority to and the benefit of U.S. Provisional Patent Application No. 61/871,632 filed on Aug. 29, 2013 and entitled "SYSTEM AND METHOD FOR A GARDEN TABLE ASSEMBLY," and to U.S. Non-Provisional patent application Ser. No. 14/470,010, filed Aug. 27, 2014 and entitled "SYSTEM AND METHOD FOR A GARDEN TABLE ASSEMBLY," which are incorporated herein by reference in their entirety.

FIELD

The present disclosure is related to a table and related structures.

BACKGROUND

There is a long felt need for catch basins having integral raised platforms. Moreover, drainage may be difficult for large raised planter systems. Aspects of this disclosure address these and other concerns.

SUMMARY

The present disclosure relates to an improved furniture system designed to address, among other things, the aforementioned deficiencies in prior art furniture assemblies and/or raised planter systems.

According to various embodiments, a furniture system including a first wooden horizontal platform, a second wooden horizontal platform, a pitched water-tight metal basin disposed between the first wooden horizontal platform and the second wooden horizontal platform, one or more support members configured to at least one of support and raise at least one of the first wooden horizontal platform, the second wooden horizontal platform and the pitched water-tight metal basin from ground level and a first porous mesh metal container positioned at least partially within the pitched water-tight metal basin, wherein the first porous mesh metal container comprises a first lip of bent metal configured to at least partially overhang an opening of the pitched water-tight metal basin and a second lip of bent metal configured to at least partially overhang the opening of the pitched water-tight metal basin is described herein. The first wooden horizontal platform may be coated with a fiberglass resin. The second wooden horizontal platform may be coated with the fiberglass resin.

The furniture system may include a freestanding first bench comprising a third wooden horizontal platform, wherein the height of the wood of the third wooden horizontal platform is substantially equal to the height of the wood of the first wooden horizontal platform, wherein the third wooden horizontal platform is coated with the fiberglass resin, and further comprising a freestanding second bench comprising a fourth wooden horizontal platform, wherein the height of the wood of the fourth wooden horizontal platform is substantially equal to the height of the wood of the second wooden horizontal platform, wherein the fourth wooden horizontal platform is coated with the fiberglass resin. A natural groove of at least one of 1) the first wooden horizontal platform, 2) the second wooden horizontal platform, 3) the third wooden horizontal platform and 4) the fourth wooden horizontal platform which creates a substantially non-level surface is filled with a keepsake and the fiberglass resin to create a substantially level surface. The keepsake may be a flat space filling intrigue adding element, such as a coin (e.g., penny). The keepsake may serve as a source identifier. For instance, an additional trademark and the keepsake shall indicate to others that the product is authentic and from the known makers. The natural groove is a knot and/or split in the wood.

The furniture system may include a second porous mesh metal container positioned at least partially within the pitched water-tight metal basin. The second porous mesh metal container may include a first lip of bent metal configured to at least partially overhang an opening of the pitched water-tight metal basin and a second lip of bent metal configured to at least partially overhang the opening of the pitched water-tight metal basin. The furniture system may include a first end metal container positioned adjacent the first porous mesh metal container located external to and adjacent to one end of the pitched water-tight metal basin, wherein the first end metal container is disposed between the first wooden horizontal platform and the second wooden horizontal platform. The furniture system may include a second end metal container positioned adjacent the second porous mesh metal container located external to and adjacent to one end of the pitched water-tight metal basin. The second end metal container is disposed between the first wooden horizontal platform and the second wooden horizontal platform. The cumulative lengths of first end metal container, the first porous mesh metal container, the second porous mesh metal container, and the second end metal container are substantially equal to the length of the first wooden horizontal platform, and wherein the cumulative lengths of first end metal container, the first porous mesh metal container, the second porous mesh metal container, and the second end metal container are substantially equal to the length of the second wooden horizontal platform.

The mouth of the pitched water-tight metal basin is centered both on the x axis and the y axis of a perimeter formed by a distal edge of the first end metal container, a distal edge of the first porous mesh metal container, a distal edge of the second porous mesh metal container, and a distal edge of the second end metal container. The pitched water-tight metal basin may span a shorter length than the length of the first wooden horizontal platform. The pitched water-tight metal basin may span a shorter length than the length of the second wooden horizontal platform, and wherein the length of the first wooden horizontal platform and the length of the second wooden horizontal platform are substantially equal. The pitched water-tight metal basin may span a shorter width than the width of the first wooden horizontal platform. The pitched water-tight metal basin may span a shorter width than the width of the second wooden horizontal platform, and wherein the width of the first wooden horizontal platform and the width of the second wooden horizontal platform are substantially equal. The pitched water-tight metal basin may comprise a drain plug. According to various embodiments, the pitched water-tight metal basin may not be made of wood.

According to various embodiments, the pitched water-tight metal basin and ordered repeated openings in the sides and base of the first porous mesh metal container are configured for drainage, aeration and/or hydroponic growing. A channel may be formed between the inside bottom surface of the pitched water-tight metal basin and the underside of the first porous mesh metal container.

According to various embodiments, a tabletop surface is disclosed herein. The tabletop surface may include a first wooden portion and a second wooden portion, wherein the first wooden portion of the tabletop surface and the second wooden portion of the tabletop surface are separated from contact by an open metal basin there between. The open metal basin bottom inside surface may be pitched towards one side of the open metal basin. The length of the open metal basin is shorter than the length of the first wooden tabletop surface, wherein the open metal basin is centered on a x axis and a y axis of an outer perimeter of the tabletop surface. The open metal basin may overhang at least a portion of a proximate edge of the first wooden tabletop surface and at least a portion of a proximate edge of the second wooden tabletop surface. Two opposite interior walls of the open metal basin may be configured such that a first side is taller than an opposite second side.

According to various embodiments, a furniture system including a first wooden horizontal platform, a second wooden horizontal platform, a pitched water-tight metal basin disposed between the first wooden horizontal platform and the second wooden horizontal platform, wherein a first lip of the pitched water-tight metal basin and a second lip of the pitched water-tight metal basin overhang at least a portion of the first wooden horizontal platform and the second wooden horizontal platform; one or more metal support members configured to at least one of support and raise at least one of the first wooden horizontal platform, the second wooden horizontal platform and the pitched water-tight metal basin from ground level; a first porous mesh metal container positioned at least partially within the pitched water-tight metal basin, wherein the first porous mesh metal container comprises a first lip of bent metal configured to at least partially overhang an opening of the pitched water-tight metal basin and a second lip of bent metal configured to at least partially overhang the opening of the pitched water-tight metal basin; a second porous mesh metal container positioned at least partially within the pitched water-tight metal basin, wherein the second porous mesh metal container comprises a first lip of bent metal configured to at least partially overhang the opening of the pitched water-tight metal basin and a second lip of bent metal configured to at least partially overhang the opening of the pitched water-tight metal basin; a first end metal container positioned adjacent the first porous mesh metal container located external to and adjacent to the pitched water-tight metal basin, wherein the first end metal container is disposed between the first wooden horizontal platform and the second wooden horizontal platform; and a second end metal container positioned adjacent the second porous mesh metal container located external to and adjacent to the pitched water-tight metal basin, wherein the second end metal container is disposed between the first wooden horizontal platform and the second wooden horizontal platform, wherein the cumulative lengths of first end metal container, the first porous mesh metal container, the second porous mesh metal container, and the second end metal container are substantially equal to the length of the first wooden horizontal platform, wherein a length of the pitched water-tight metal basin is substantially equal to the cumulative length of the first porous mesh metal container and the second porous mesh metal container is disclosed herein.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Aspects of the present description are described as being fashioned from a desired material however; it should be appreciated that any element may be suitably fashioned from any suitable material, such as woods, metals, polymers, plastics, composites, and/or the like.

Figure 1:
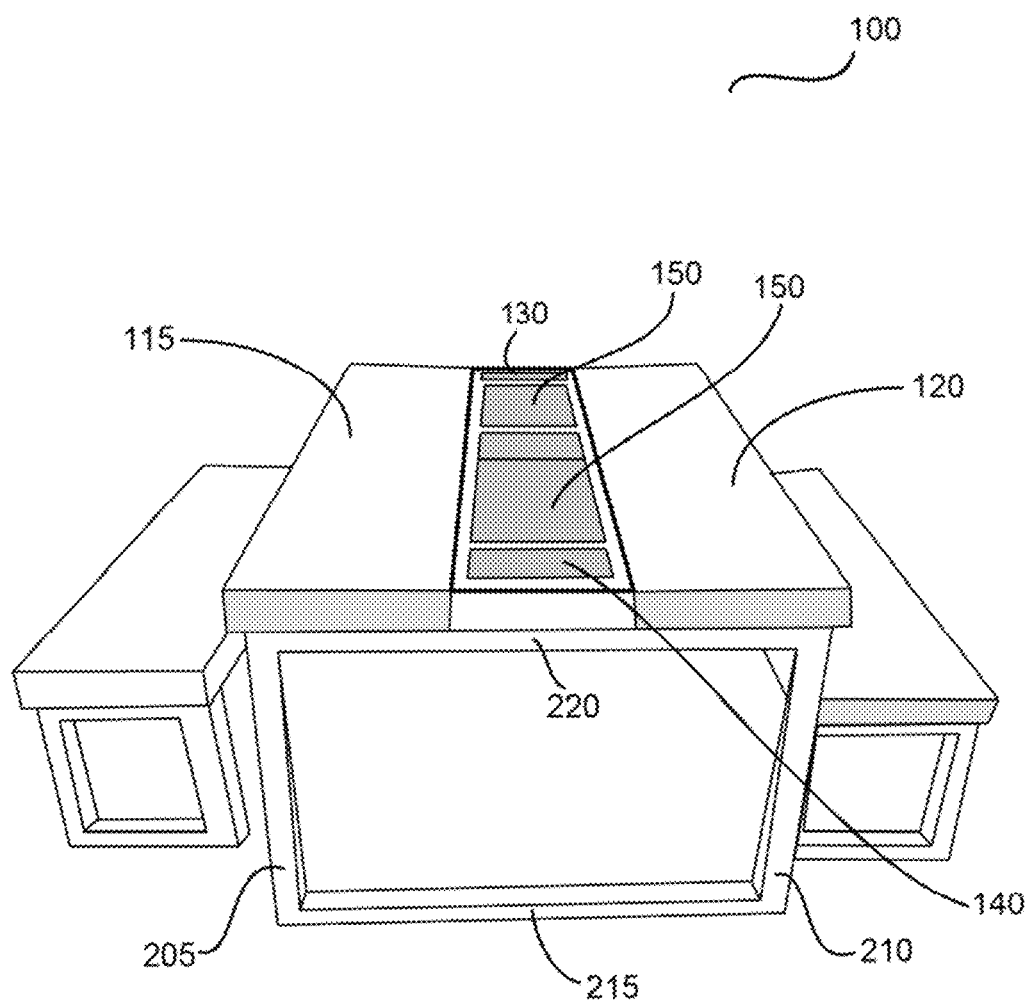
FIG. 1 illustrates a garden table assembly, in accordance with various embodiments.
Figure 2:
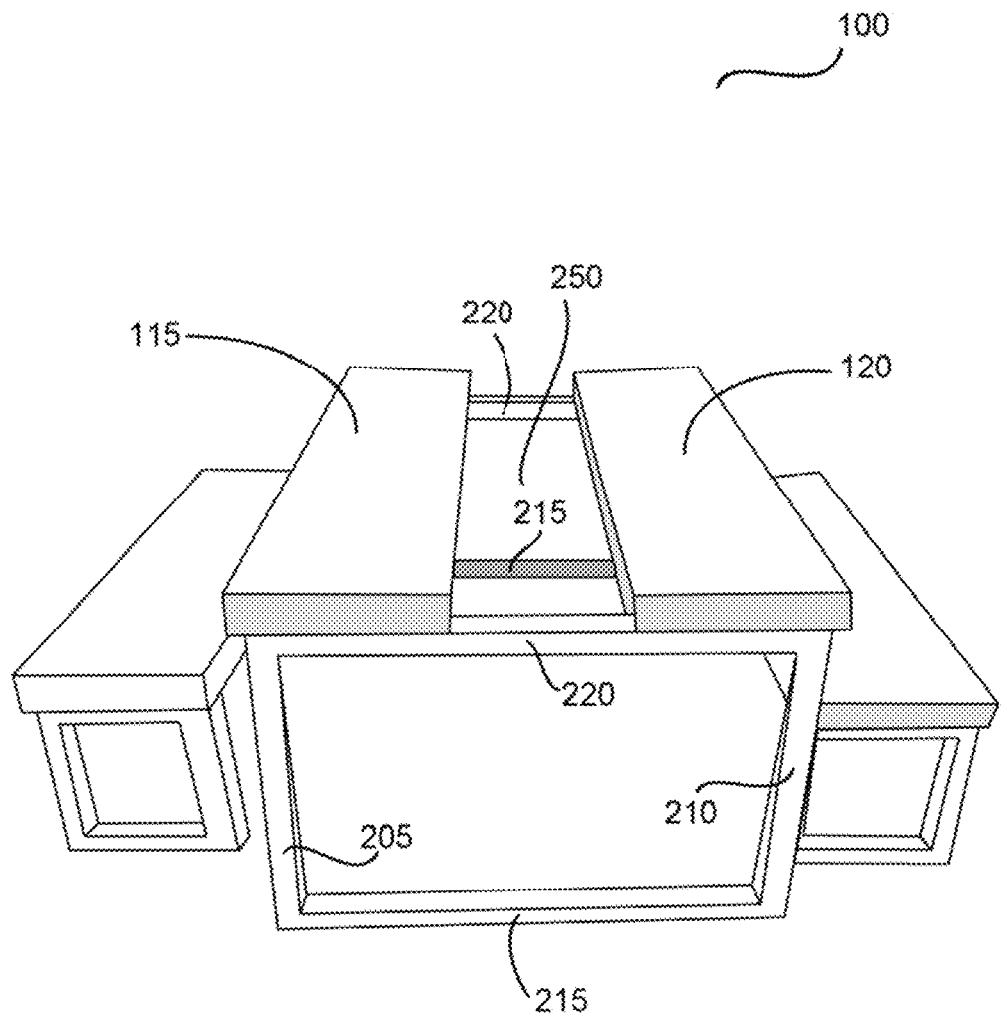
FIG. 2 illustrates a garden table assembly with a removed basin, in accordance with various embodiments.
Figure 3:
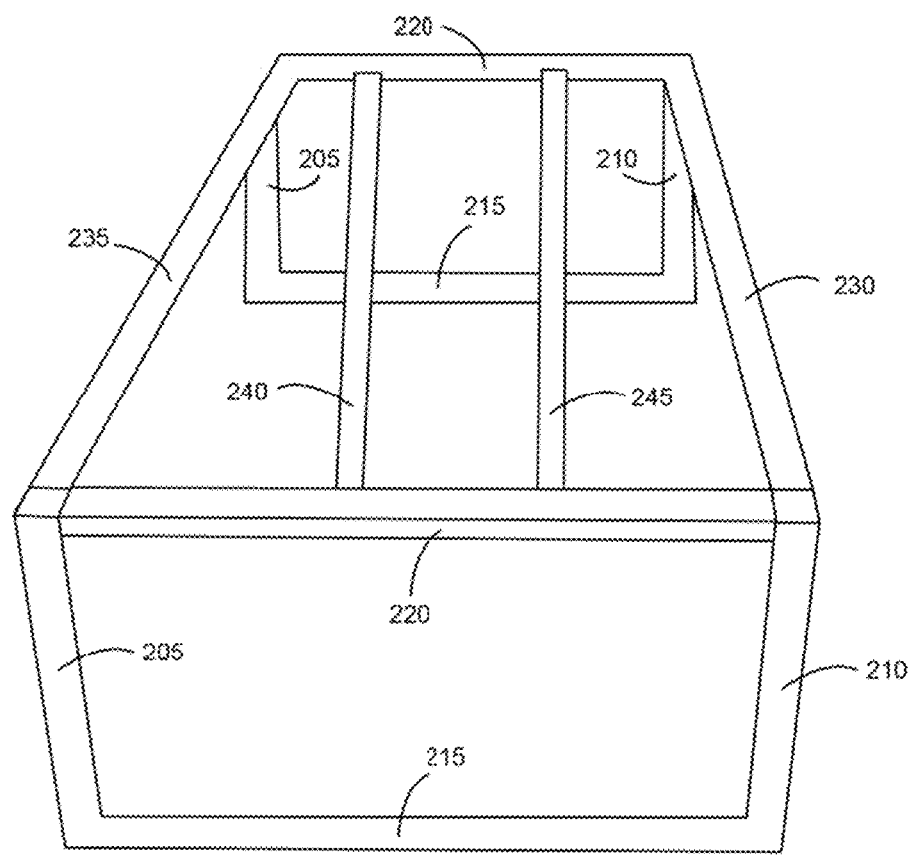
FIG. 3 illustrates an exemplary sub-frame of the garden table assembly in accordance with an exemplary embodiment.

According to various embodiments and with reference to FIGS. 1-3, a furniture system 100 is disclosed. The furniture system 100 may comprise a garden table. Furniture system 100 may comprise one or more raised horizontal platforms 115, 120. The plurality of platforms 115, 120 may flank a basin 400, such as a catch basin (See FIG. 4). The furniture system 100 may comprise one or more support members, such as support members 205, 210, 215, 220, 230, 235, 240, 245. Furniture system 100 may comprise one or more containers, such as containers 130, 140, 150.

Raised platform 115, 120 may be any suitable dimension and/or shape, however, in a preferred embodiment, each raised platform 115, 120 is a hexahedron, (e.g. a polyhedron with six faces.) At least one of the six faces of the raised platform may be substantially parallel with the plane of the ground. As previously noted, the dimensions of this face may be any suitable dimension, but are generally between about 12-40 inches wide, and preferably about 14-20 inches wide. The length of each raised platform 115, 120 may be any suitable dimension, however, in a preferred embodiment, each raised platform 115, 120 is preferably between about 30 and 60 inches long, such as about 40 inches long. The height of each raised platform 115, 120 may be any suitable dimension, however, in a preferred embodiment, each raised platform 115, 120 is preferably between about 1 and 10 inches tall, such as about 3 inches in height.

Raised platform 115, 120 may be made from any suitable material. According to various embodiments, raised platform 115, 120 is made from wood. The wood may be reclaimed wood. The wood may be treated. The wood may be refurbished. The wood may be new and/or treated to appear as weathered and/or aged. Raised platform 115, 120 may be a solid wood plank. In the alternative, one or more wood pieces/planks may be joined to form raised platform 115, 120.

According to various embodiments and with renewed reference to FIG. 3, a support structure to raise basin 400 and/or platforms 115, 120 a predetermined height off the ground may be integral to furniture system 100. For instance, though they may be arranged in any suitable orientation, support members, such as support members 205, 210, 215 and 220 may be fashioned into a generally rectangular shape. A pair of these rectangular shaped/fashioned support members may be cross braced by support members 230, 235, 240, 245. For instance, a side surface of support structure 215 may make contact with the ground. The rectangle formed by support members 205, 210, 215 and 220 may be oriented normal to the plane of the ground. Cross brace support members 230, 235, 240, 245 may be oriented substantially parallel to the plane of the ground and/or normal to the orientation of the formed rectangles formed by support members 205, 210, 215 and 220. Stated another way, the rectangles formed by support members 205, 210, 215 and 220 coupled to one or more cross brace support members 230, 235, 240 may generally form a "U" shape. Though support members 205, 210, 215 and 220 are depicted in the Figures as forming a rectangle, any suitable structure for raising platform 115, 120 and/or basin 400 above the ground may be employed. For instance, support members may be oriented to form an "X" shape, an "H" shape, a circular formation, in an octagonal or hexagonal formation. The two sides of support members coupled together via cross brace support members 230, 235, 240 need not form the same shape.

According to various embodiments, the rectangles formed by support members 205, 210, 215 and 220 may be coupled together via platforms 115, 120; basin 400 and/or basin 400 and platforms 115, 120. Stated another way, support members 205, 210, 215 and 220 may be coupled together without cross bars/braces, such as cross brace support members 230, 235, 240, 245.

Support members 205, 210, 215, 220, 230, 235, 240, 245 may be made from any desired material. For instance, support members 205, 210, 215, 220, 230, 235, 240, 245 may be made of steel tubing, aluminum, titanium, stainless steel, cast iron and/or the like. In general, though they may be coupled together through any desired coupling mechanism, adjacent support members 205, 210, 215, 220, 230, 235, 240, 245 are welded together. For instance, adjacent support members 205, 210, 215, 220, 230, 235, 240, 245 may be TIG welded, MIG welded, arc welded, fusion welded, spot welded and/or the like. Corners of adjacent support members 205, 210, 215, 220, 230, 235, 240, 245 may be joined together on any suitable angle. Corners of adjacent support members 205, 210, 215, 220, 230, 235, 240, 245 may be welded together on a 45° or 90° miter, as desired.

Raised platforms 115, 120 may be coupled, permanently, semi-permanently, or removably to cross brace support members 230, 235, 240, 245. According to various embodiments, raised platforms 115, 120 may be coupled to basin 400 for additional support.

Figure 4:
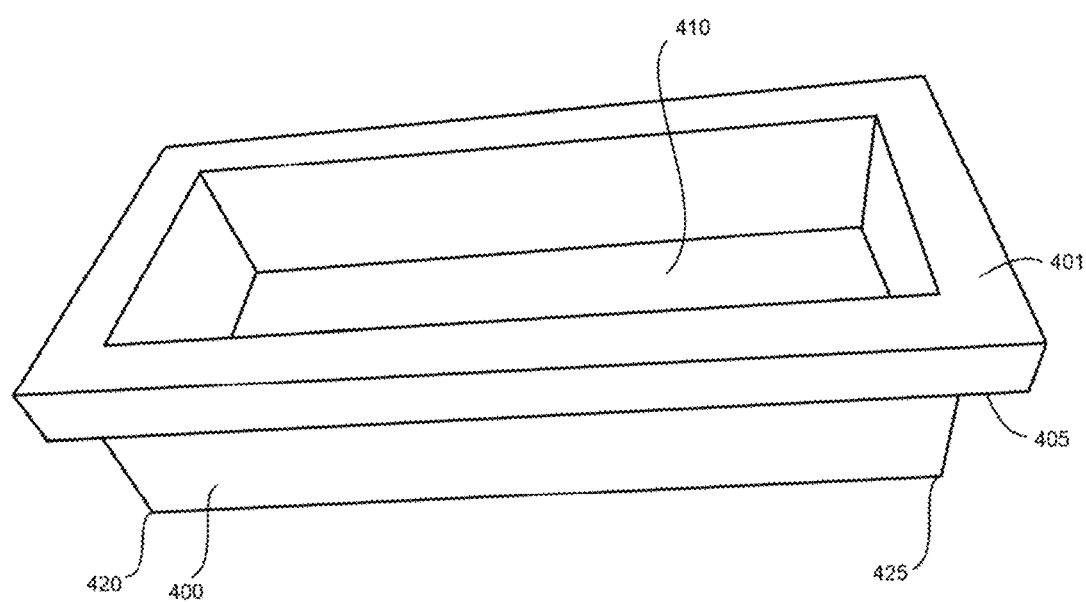
FIG. 4 illustrates a side view of a basin in accordance with various embodiments.

According to various embodiments and with renewed reference to FIGS. 1 and 4, furniture system 100 may comprise a basin 400. Basin 400 may be coupled to one or more frame elements 210, 240, 245 and/or raised platforms 115, 120. Basin 400 may be located in any location; however, according to various embodiments, basin 400 is oriented substantially between a pair of raised platforms 115, 120. According to various embodiments, a center line of basin 400 is sustainably centered on, and collocated with, the centerline of the furniture system 100 in both the X axis and the Y axis.

According to various embodiments, basin 400 may be mounted in a fixed position, and provide structural support to furniture system 100. According to various embodiments, basin 400 may be semi-permanent and removable. Basin 400 may be any desired shape or any desired dimension. Preferably, a side surface of basin 400 abuts a side surface of each raised platform 115, 120. Stated another way, there is no and/or minimal gap between a side wall of basin 400 and one or more raised platforms 115, 120. Portions of basin 400 may overlap portions of raised platform 115, 120. Similarly, portions of raised platform 115, 120 may overlap portions of basin 400.

Basin 400 may form a box with a base 410 having a rectangular shape. The box may have any desired depth and/or volume. Basin 400 may be water tight (such as of such tight construction or fit as to be impermeable to water). The base 410 of basin 400 may be pitched or canted such that liquid, such as water and/or waste water, may flow from a proximate end of basin 400, such as end 425 to a distal end of basin 400, such as towards end 420 (See FIG. 8). The interior of basin 400 may be treated with a coating to encourage liquid beading and/or flow. The pitch/angle of the slope of basin 400 base 410 may be linear. Thus, the base 410 of basin 400 may not be parallel to the face of platform 115, 120. Two opposite interior walls of basin 400 may be fashioned such that one side is taller than the other (See FIG. 8). Stated another way, measuring from flange 401, the distance to the base 410 of an interior side of the interior "box" formed from the basin 400 walls may be 8 inches on proximate side 425. Similarly, measuring from flange 401, the distance to the base 410 of an opposite interior side of the interior "box" formed from the basin 400 walls may be about 10 inches on distal side 420. Hand brakes, press brakes, manual manipulation and/or specialized tooling may be utilized to form basin 400. According to various embodiments, a magnetic hand brake may be utilized to form basin 400 allowing for virtually limitless formations and various geometric designs. The magnetic hand brake may have 180° of freedom. Powerful magnets allow for materials, such as steel, to be formed in specific, highly reproducible, angles. The magnetic hand brake further comprises a bending apparatus attached to it that allows you to bend material in any dimension at any angle. This formation may assist with drainage of basin 400. Opposite interior sides of basin 400 may be parallel.

Figure 8:
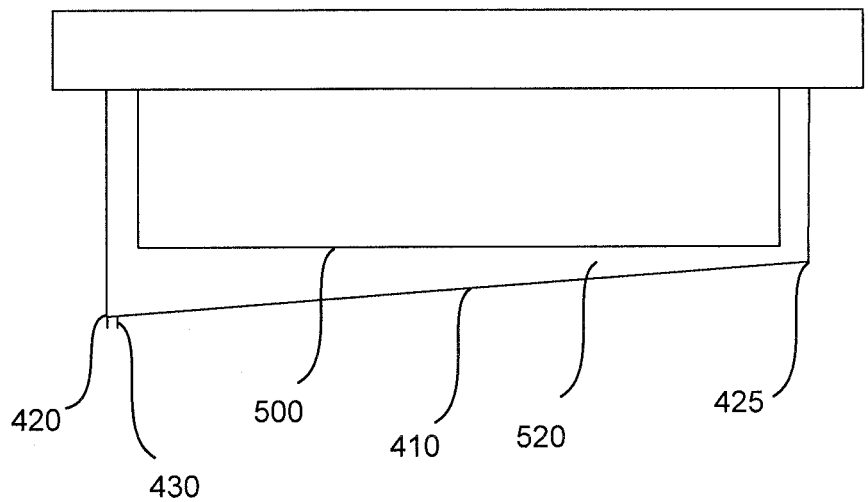
FIG. 8 illustrates a cross-sectional side view of portions of a garden table assembly in accordance with various embodiments.

A valve 430 may be coupled to a low point of end 420, such as in a corner or along an edge, such that liquid may be drained from basin 400 (See FIG. 8). The valve 430 may be any type of valve such as a quarter-turn valve (rotary valve); ball valve, butterfly valve, plug valve, spherical valve or a multi-turn valve (linear motion valves); such as a gate valve, globe valve, fixed cone valve, needle valve and pinch valve. The valve 430 may be a cork or pressure fit stopper. The valve 430 may be welded to basin 400. The valve 430 may be sealed such that liquid from basin 400 does not escape basin 400 at the valve coupling point other than interior to the valve 430.

Basin 400 may comprise flanges 401 for coupling basin 400 to the furniture system 100. For instance, as shown in FIG. 4, a flange 401 may be coupled to and/or formed from the material of basin 400. A portion of flange 401, such as the underside 405 of flange 401 may be coupled to a portion of the furniture system 100. For instance, one or more flange 401 may be sandwiched between the coupling of raised platform 115, 120 and a structural member 240, 245.

According to various embodiments, a flange 401 of basin 400 may rest on top of platform 115, 120. According to various embodiments, the plane of the initial opening of basin 400, defined by the perimeter of flange 410, is in line with the plane of a face of platforms 115, 120. According to various embodiments, basin 400 may be coupled to platform 115, 120, such as by lagged basin 400 into platform 115, 120, and/or basin 400 may be welded, such as via stitch welds, into the cross support members 240, 245. A stitch weld may be an approximately one-inch segment of welds. For instance, a one-inch stitch weld may be made every six inches along structural member 240, 245. Thus, basin 400 ties the entire structure of the furniture system 100 such as the raised platform 115, 120, to the catch basin 400, to the steel frame structural members 205, 210, 215, 220, 230, 235, 240, 245 to form a single, contiguous, solid apparatus, such as a table and more particularly a garden table. The basin 400 being stitch welded and/or lagged through either the underside or the side of the raised platform 115, 120 adds to the support of the frame and/or various support members.

Containers 140, 130, 150 may be received by the opening of basin 400 (as depicted in FIG. 1). Each container 140, 130, 150 may be any desired dimension. Containers 140, 130, 150 may be made from any suitable material, such as woods, metals, polymers composites, and/or the like. With referee to FIGS. 5A and 5B, container 150 may be a planter 500. Planter 500 may be made from any suitable material. For instance, planter 500 may be made from expanded and/or perforated 510 steel. Planter 500 may comprise perforations 510 (via the expanded steel) such that the walls and/or base of the planter structure is porous, such as a mesh, and permit the flow of water and/or other liquid deliverable from the planter 500 to the basin 400 and/or from the basin 400 to the planter 500. Planter 500 may comprise ordered perforations 510 (via the expanded steel) such that the walls and/or base of the planter structure is porous and permit the growth of roots of plants down into basin 400, such as to support hydroponics. Planter 500 may be any desired shape; however, the exterior walls and shape of planter 500 preferably mirror a shape of the interior walls of basin 400.

With reference to FIG. 1, containers 130 and 140 may be located outside of basin 400 while containers 150 and 150 are located within/inserted into basin 400. In this way, basin 400 and containers 130 and 140 may fill, such as completely span, the gap between platform 115 and platform 120. Stated another way, according to various embodiments, basin 400 does not span the length of either platform 115 and/or platform 120. According to various embodiments, a planter 500 of furniture system 100 may be swapped with container 150 of similar dimensions. While support members 205, 210, 215, 220 of furniture system 100 are depicted are being towards the ends of platform 115 and platform 120, in operation, according to various embodiments, support members 205, 210, 215, 220 may be located a span of inches from the ends of platform 115 and platform 120. In this way, support members 220 may interfere with the depth of containers 130 and 140. Moreover, support members 220 may interfere with the depth of basin 400. Basin 400 is, in general, located between two support members 220. Moreover, basin 400, in general, spans a height above support member 220 and below support member 220. Containers 130 and 140 may be positioned generally on top of support member 220 on each side of the assembly.

Figure 5A:
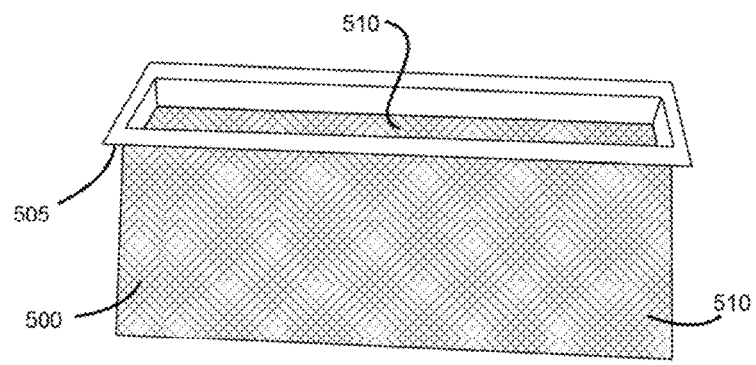
FIGS. 5A-5B illustrate containers to be received by a basin in accordance with various embodiments.
Figure 5B:
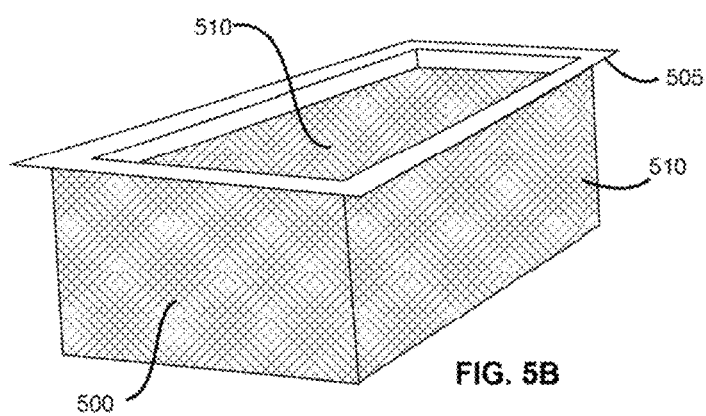

With reference to FIGS. 5A-5B, planters 500 may be formed from a solid piece of expanded steel 510. Cuts may be made in the solid piece of steel to form a desired geometric or free form shape. Generally, the sides of planter 500 are bent at 90 degrees, to form a generally open box shaped structure. At each connecting point, such as alone the corners, welds may be made via one of the aforementioned various welding techniques. Angle iron may be used to build a frame 505 for planter 500. Angle iron in this context is a piece of steel that's formed or bent at 90 degrees. Angle iron may be found in various widths, thicknesses, and lengths. The angle iron frame 505 is then welded to the expanded steel box shaped structure to form planter 500. In other words, the interior or exterior surface of the expanded steel box mates with an angle iron frame that substantially mirrors the dimensions of the perimeter of the planter 500. The angle iron frame 505 may form a lip of planter 500 that rests upon the surface of furniture system 100 and suspends planter 500. Planter 500 may be configured to be received by the interior opening of catch basin 400. The lip of angle iron frame 505 may rest on top of platform 115, 120 and/or on top of flange 401 of basin 400. Planter 500 may be any desired depth, however and preferably, the bottom of planter 500 does not make contact with the base of basin 400 such that a channel 520 is formed between the inside bottom surface of basin 400 and the underside of planter 500 (See FIG. 8). This orientation allows room for water drainage and/or liquid flow, such as beneath and/or through planter 500. Planter 500 may be lifted out of basin 400 at any time. Planter 500 may run any desired length. Planter 500 may comprise re-positionable dividers that separate planter 500 into chambers. Each planter 500 may be any desired length, width or depth, but is generally constrained by the width and depth of basin 400. Preferably, basin 400 is substantially filled with one or more planter 500. Planter 500 may be configured to receive soil, fertilizer, living plants such as herbs, vegetables, flowers, roots in its interior 510.

Containers 130, 140, 150 may be formed from a solid piece of material, such as sheet metal. Cuts may be made in the solid piece of sheet metal to form a desired geometric or free form shape. Generally, the sides of containers 130, 140, 150 are bent at 90 degrees, to form a generally open box shaped structure. At each connecting point, such as alone the corners, welds may be made via one of the aforementioned various welding techniques. Angle iron may be used to build a frame for containers 130, 140, 150. The angle iron frame is then welded to the sheet metal box shaped structure to form containers 140, 130, 150. In other words, the interior or exterior surface of the sheet metal box mates with an angle iron frame that substantially mirrors the dimensions of the perimeter of the box. The angle iron frame may form a lip of containers 130, 140, 150 that rests upon surface of furniture system 100 and suspends containers 130, 140, 150.

In the alternative, containers 130, 140, 150 may be formed entirely out of a material (e.g. entirely out of welded sheet metal without the use of an angle iron frame or angle iron flange). The cut, shaped/bent edges may be formed into a flange, such as a 90 degree flange, from the solid piece of material that is configured to rest upon a surface of furniture system 100 and suspend containers 130, 140, 150. Containers 130, 140, 150 may be configured to be positioned adjacent to an exterior side wall of basin 400. The lip of angle iron and/or sheet metal flange may rest on top of platform 115, 120 and/or on top of flange 401 of basin 400. Containers 130, 140, 150 may be any desired depth, however and preferably, the bottom of planter 500 does not make contact with the base of basin 400. This orientation allows room for water drainage and/or liquid flow, such as beneath and/or through planter 500. This orientation allows room for water drainage and/or liquid flow, such as beneath and/or through planter 500. In the alternative, containers 130, 140, 150 may be shaped such that only a portion of planter 500 does not make contact with the base of basin 400, such as by having a pass-through portion. Containers 130, 140, 150 may be lifted out of furniture system 100 at any time. Containers 130, 140, 150 may be any desired length, width or depth but are generally constrained by the width and depth of a gap 250 between raised platforms 115, 120.

Containers 140, 130 may have clips, holes or surface contours to house utensils, bottles, cups, plates, napkins, trash, bottle openers, tools. Containers 150 may have be configured to house ice, bottles cans, cups, serving ware. Containers 150 may have be configured to aquariums and/or habitats. Containers 150, 140, 130 may be formed with a lid.

According to various embodiments, furniture system 100 may comprise 150, 140, 130 and planter 500 concurrently. According to various embodiments, a planter 500 of furniture system 100 may be swapped with container 150 of similar dimensions.

According to various embodiments, furniture system 100 may further comprise a central watering system. For instance, the central watering system may comprise internal plumbing that runs through one or more support members 205, 210, 215, 220, 230, 235, 240, 245 of furniture system 100. This internal plumbing may terminate and/or be coupled to catch basin 400 and/or one or more planter 500. Thus, the central watering system may comprise an automatic watering function if coupled to a controller and/or water source (e.g. a drip system). This may reduce and/or negate the need for manual watering of the contents of the planter 500. Similarly, support members 205, 210, 215, 220, 230, 235, 240, 245 may be plumbed for gas, so you can have a fire feature integral to the furniture system 100. Electrical wires may be run through support members 205, 210, 215, 220, 230, 235, 240, 245 and coupled to lighting or other electrical equipment integral to the furniture system 100.

According to various embodiments, a building process of furniture system 100 may be as follows. Square steel tubing of desired suitable dimensions, such as approximately 2 by 2 square steel tubing, of approximately O60 wall to O83 wall thickness is cut to a desired length. Round tubing, angle iron, I-beams, channel, unistrut, sheet metal formed on any number of metal bending machines may be used in lieu of and/or in addition to square tubing. Similarly, aluminum, aluminum tubing, aluminum angle iron, I-beams, and channel may be used in forming elements furniture system 100. These materials may be cut to appropriate lengths. Support member 215 may be welded to support member 205 and/or support member 210. Support member 205 may be welded to support member 220. Support member 210 may be welded to support member 220. Thus, a rectangular side is formed. A second rectangular side may be formed of the same process. Cross-braces are cut to appropriate lengths to connect the two formed rectangles support members to form a steel sub-frame. Stated another way, the two rectangles are upright at 90 degrees, and the horizontal pieces, support members 230, 235 attach the two rectangles together near the top of the furniture system 100.

According to various embodiments, at least one smaller diameter tubing 240, 245 spans from a first rectangle support structure to a second rectangle shaped support structure. In general, these smaller diameter tubing 240, 245 are spaced with a gap 250 in between for receiving basin 400. The gap 250 may be any desired width but is preferably about 12 inches. Basin 400 may attach to center cross-braces 240, 245. Support members 230, 235 and support members 240, 245 may be coupled to other portions of furniture system 100 through any desired means. Support members 230, 235 and support members 240, 245 may be welding in position. They could be riveted in. A bracket may be coupled to each support member 230, 235, 240, 245 support member 230, 235, 240, 245 may be riveted together. Support members 205, 210, 215, 220, 230, 235, 240, 245 may be screwed together, bolted together, glued together, epoxied together. Any welded corner could be a bend-formed piece. For instance, the rectangular sides may be formed out of bent tubing.

Holes, such as approximately $5/16^{th}$ holes are drilled in both the support members 235, 230, 220 through both walls of the tubing at desired intervals.

Figure 6:
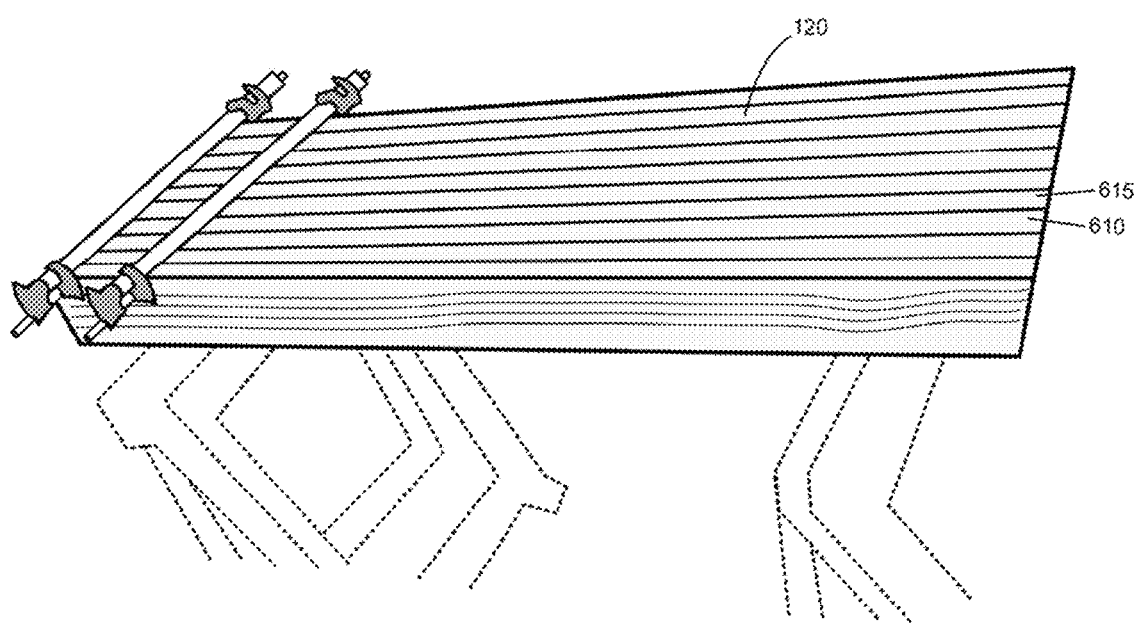
FIG. 6 illustrates a platform structure in accordance with various embodiments.
Figure 7:
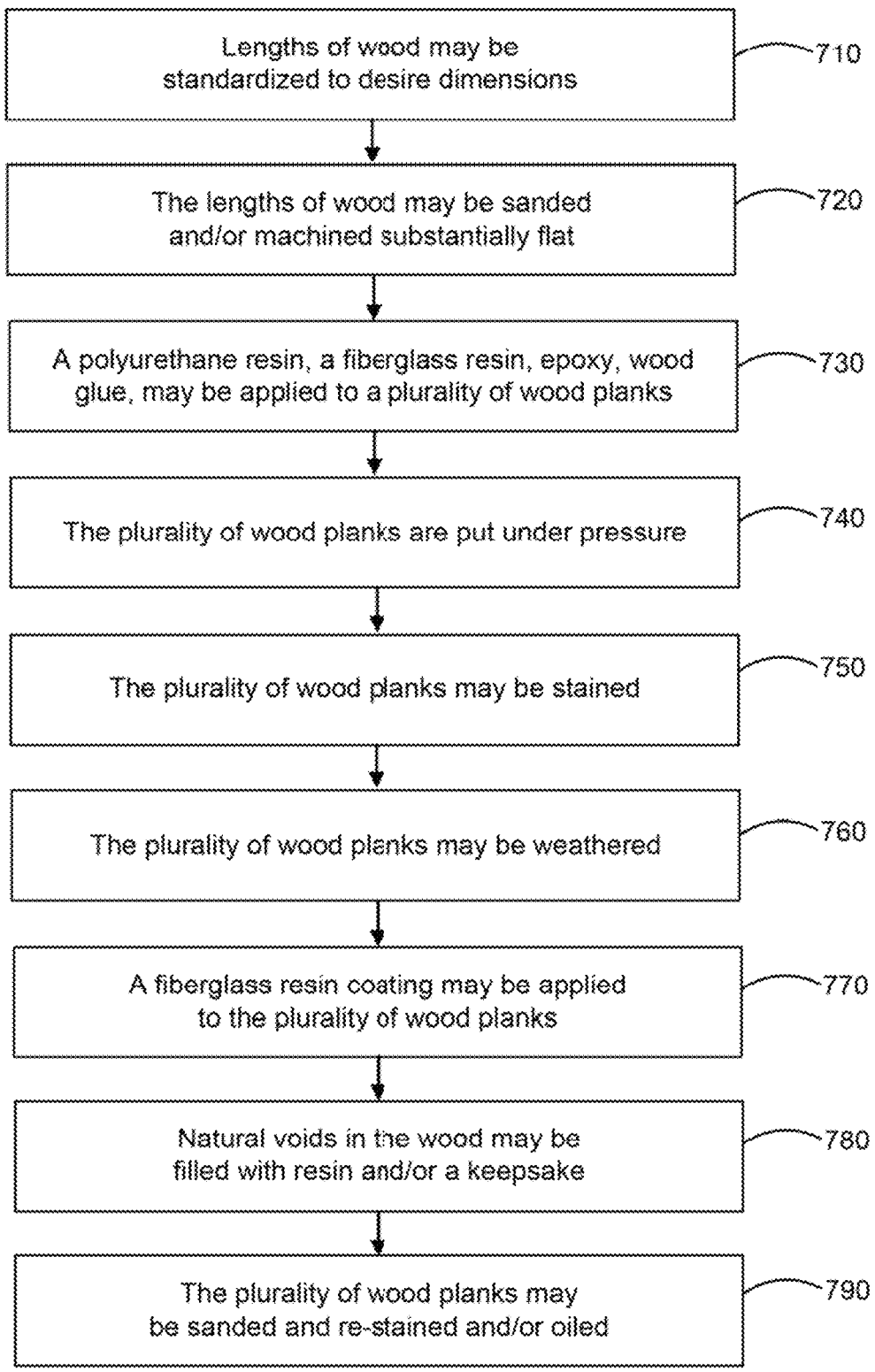
FIG. 7 depicts a process flow for the creation of a wooden platform.

According to various embodiments and with reference to FIG. 7, prior to forming platform 115, 120, each piece of wood is standardized to desired dimensions (Step 710). For instance, the wood of raised platform 115, 120 may be milled to specific measurements. This wood is then sanded. Preferably a top surface of platform 115, 120, is substantially flat and/or level (Step 720). Next, a polyurethane resin, a fiberglass resin, epoxy, wood glue, may be applied to a plurality of wood planks/sections 610, 615 (See FIG. 6). The plurality of wood planks/sections 610, 615 are put under pressure, such as via clamps (Step 730, 740). These coating may reinforce the lumber. Often times this increases the structural soundness of the lumber, such as the reclaimed lumber which may comprise cracks or a split. From there, the wood of platform 115, 120 hexahedron section may be stained (Step 750). The stains may vary from a variety of stains, such as a vinegar based stain, patina, or coating to weather the wood.

Figure 9:
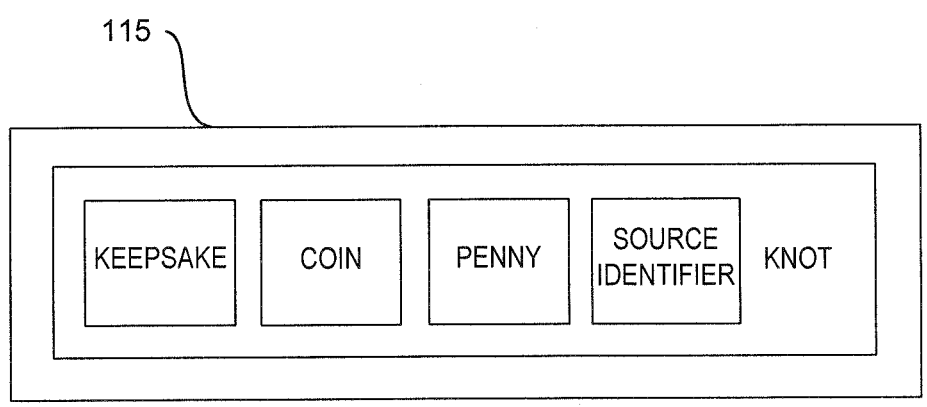
FIG. 9 depicts a box diagram of portions of a garden table assembly in accordance with various embodiments.

According to various embodiments, treatment to weather the surface may be performed (Step 760). This treatment may include blunt impact, cuts, burns and the like to the surface. A polyurethane clear coat, an epoxy, a polyurethane epoxy, a bar top surface and/or the like may be applied to the surface. According to various embodiments, a low VOC clear coat, which is a food grade safe clear coat, may be applied to the wood of platforms 115, 120. According to various embodiments, a fiberglass resin coating may be applied to the wood of platforms 115, 120 (Step 770). These coatings may be applied prior to and/or after coupling platform 115, 120 to the structural supports 230, 235, 240, 245. As these platforms are positioned adjacent water holding elements, and water may be detrimental to the wood of platforms 115, 120, these coating may extend the lifespan and add strength to platforms 115, 120. With reference to FIGS. 7 and 9, should platforms 115, 120 have a natural void, such as a split or knot of the wood, a coating, such as the fiberglass coating, may be added to fill the natural void to achieve a substantially flat and/or level surface (Step 780). Should excess coating be needed additional elements may be added within the natural void to act as a source identifier (in addition to other trademarking) add intrigue and to fill the space, as excess coating in such as void may appear dull or cloudy. The additional element may be a keepsake, such as a coin (e.g., a penny). A natural void may be expanded to accommodate insertion of the keepsake. The wood of platforms 115, 120 may be sanded and re-stained if desired (Step 790).

The platforms 115, 120 are anchored to the support members 220, 235, 230 onto each side of the tubing of the sub-frame via the predrilled holes. The platforms 115, 120 are sized to overhang the rectangular shaped support members formed by support members 205, 210, 215, 220. This overhang is approximately the width of container 130 and/or container 140. A wood lag, such as a 5/16ths inch wood lag, runs through the sub-frame, the steel frame base or the metal frame base, and then that goes into the platform 115, 120.

Catch basin 400 may be attached prior to platform 115, 120 being coupled to the steel sub-frame or after platform 115, 120 is coupled to the steel sub-frame. Basin 400 may be stitch weld to the metal sub-frame. The sub-frame may be coated. This coating may be a spray paint coating, a powder coat coating, an enamel coating, such as an acrylic coating, galvanized, plating, anodizing or patina finish. In the alternative, the steel may be left raw and with the ability to rust.

The one or more platform 115, 120, once it is anchored to the sub-frame, may be stained or weathered.

Lower platforms, may flank raised platforms 115, 120. These lower platforms may be configured for sitting. Thus, lower platforms may form benches. The benches may be coupled to the furniture system 100 and/or configured to be nested under furniture system 100. According to various embodiments and with reference to FIGS. 1-2, similar to aspects of sub-frame, lower platforms may comprise one or more support members. These support members may be coupled together in any desired orientation and/or shape. For instance, similar to the processes described above, support members of the lower platforms may be formed into rectangles and cross braced. A pair of rectangular shaped formed support members coupled together via a cross brace may generally form a "U" shape.

Lower platform may be any suitable dimension and/or shape, however, in a preferred embodiment; each lower platform is a hexahedron, (e.g. a polyhedron with six faces.) At least one of the six faces of the lower platform may be substantially parallel with the plane of the ground. As previously noted, the dimensions of this face may be any suitable dimension, but are generally between about 12-40 inches wide, and preferably about 14-20 inches wide. The length of each lower platform may be any suitable dimension, however, in a preferred embodiment; each lower platform is preferably less than the width of the span of the sub-frame. The height of the face of each lower platform may be any suitable dimension, however, in a preferred embodiment the height of the face of each lower platform is configured for comfortable seating with respect to addressing raised platform 115, 120.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. As used herein, the term adjacent may mean in close proximity to, but does not necessarily require contact. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A tabletop surface comprising:
    a first horizontal platform of the tabletop surface;
    an open basin disposed horizontal to the first horizontal platform such that the open basin defines an opening parallel to the first horizontal platform, wherein a bottom inside surface of the open basin is pitched towards at least one side of the open basin;
    a first porous container positioned at least partially within the open basin, the first porous container comprising a lip configured to at least partially overhang the opening of the open basin; and
    a second horizontal platform of the tabletop surface, wherein the open basin is disposed horizontally between the first horizontal platform and the second horizontal platform, such that the first horizontal platform and the second horizontal platform are at least partially separated from contact, wherein at least a portion of the open basin overhangs at least a portion of a proximate edge of the first horizontal platform and at least a portion of a proximate edge of the second horizontal platform.

2. The tabletop surface of claim 1, wherein a length of the open basin is shorter than a length of the first horizontal platform.

3. The tabletop surface of claim 2, wherein the open basin is centered on a x axis and a y axis of an outer perimeter of the tabletop surface.

4. The tabletop surface of claim 1, wherein two opposite interior walls of the open basin are configured such that a first side is taller than an opposite second side.

5. A furniture system comprising:
a pitched water-tight basin disposed horizontally between a first horizontal platform and a second horizontal platform;
one or more support members configured to at least one of support and raise at least one of the first horizontal platform and the pitched water-tight basin from ground level; and
a first porous container positioned at least partially within the pitched water-tight basin, wherein the first porous container comprises a lip configured to at least partially overhang an opening of the pitched water-tight basin;
a first end container positioned adjacent the first porous container located external to the pitched water-tight basin, wherein the first end container is disposed between the first horizontal platform and the second horizontal platform; and
a second end container positioned adjacent the second porous container located external to the pitched water-tight basin, wherein the second end container is disposed between the first horizontal platform and the second horizontal platform, wherein the cumulative lengths of first end container, the first porous container, the second porous container, and the second end container are substantially equal to the length of the first horizontal platform, and wherein the cumulative lengths of first end container, the first porous container, the second porous container, and the second end container are substantially equal to the length of the second horizontal platform.

6. The furniture system of claim 5, further comprising a freestanding first bench comprising a third horizontal platform, and further comprising a freestanding second bench comprising a fourth horizontal platform.

7. The furniture system of claim 6, wherein at least one of the first horizontal platform, the second horizontal platform, the third horizontal platform and the fourth horizontal platform comprises a natural void and a keepsake disposed within the natural void.

8. The furniture system of claim 7, wherein at least one of the first horizontal platform, the second horizontal platform, the third horizontal platform and the fourth horizontal platform comprises wood, and the natural void comprises a knot in the wood.

9. The furniture system of claim 5, further comprising a second porous container positioned at least partially within the pitched water-tight basin, wherein the second porous container comprises a first lip configured to at least partially overhang an opening of the pitched water-tight basin and a second lip configured to at least partially overhang the opening of the pitched water-tight basin.

10. The furniture system of claim 5, wherein the pitched water-tight basin is centered both on the x axis and the y axis of a perimeter formed by a distal edge of the first end container, a distal edge of the first porous container, a distal edge of the second porous container, and a distal edge of the second end container.

11. The furniture system of claim 5, wherein the pitched water-tight basin spans a shorter length than the length of the first horizontal platform, wherein the pitched water-tight basin spans a shorter length than the length of the second horizontal platform, and wherein the length of the first horizontal platform and the length of the second horizontal platform are substantially equal.

12. The furniture system of claim 5, wherein the pitched water-tight basin spans a shorter width than the width of the first horizontal platform, wherein the pitched water-tight basin spans a shorter width than the width of the second horizontal platform, and wherein the width of the first horizontal platform and the width of the second horizontal platform are substantially equal.

13. The furniture system of claim 5, wherein the pitched water-tight basin comprises a drain plug.

14. The furniture system of claim 5, wherein the pitched water-tight basin and the first porous container are configured for hydroponic growing.

15. The furniture system of claim 5, further comprising a channel formed between the inside bottom surface of the pitched water-tight basin and the underside of the first porous container.

16. A furniture system comprising:
a first horizontal platform;
a second horizontal platform;
a pitched water-tight basin disposed between the first horizontal platform and the second horizontal platform, wherein a first lip of the pitched water-tight basin and a second lip of the pitched water-tight basin overhang at least a portion of the first horizontal platform and the second horizontal platform;
one or more metal support members configured to at least one of support and raise at least one of the first horizontal platform, the second horizontal platform and the pitched water-tight basin from ground level;
a first porous container positioned at least partially within the pitched water-tight basin, wherein the first porous container comprises a first lip configured to at least partially overhang an opening of the pitched water-tight basin and a second lip configured to at least partially overhang the opening of the pitched water-tight basin;
a second porous container positioned at least partially within the pitched water-tight basin, wherein the second porous container comprises a first lip configured to at least partially overhang the opening of the pitched water-tight basin and a second lip configured to at least partially overhang the opening of the pitched water-tight basin;
a first end container positioned adjacent the first porous container located external to and adjacent to the pitched water-tight basin, wherein the first end container is disposed between the first horizontal platform and the second horizontal platform; and
a second end container positioned adjacent the second porous container located external to and adjacent to the pitched water-tight basin, wherein the second end container is disposed between the first horizontal platform and the second horizontal platform, wherein the cumulative lengths of first end container, the first porous container, the second porous container, and the second end container are substantially equal to the length of the first horizontal platform, wherein a length of the pitched water-tight basin is substantially equal to the cumulative length of the first porous container and the second porous container.

* * * * *